United States Patent
Ahn et al.

(10) Patent No.: US 10,568,141 B2
(45) Date of Patent: Feb. 18, 2020

(54) RANDOM ACCESS METHOD AND APPARATUS THEREFOR

(71) Applicant: LG ELECTRONICS INC., Seoul (KR)

(72) Inventors: Joonkui Ahn, Seoul (KR); Suckchel Yang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 15/531,277

(22) PCT Filed: Nov. 27, 2015

(86) PCT No.: PCT/KR2015/012833
§ 371 (c)(1),
(2) Date: May 26, 2017

(87) PCT Pub. No.: WO2016/085287
PCT Pub. Date: Jun. 2, 2016

(65) Prior Publication Data
US 2018/0035465 A1    Feb. 1, 2018

Related U.S. Application Data

(60) Provisional application No. 62/085,319, filed on Nov. 27, 2014.

(51) Int. Cl.
*H04W 74/08* (2009.01)
*H04W 72/12* (2009.01)
*H04W 16/14* (2009.01)

(52) U.S. Cl.
CPC ....... *H04W 74/0833* (2013.01); *H04W 16/14* (2013.01); *H04W 72/12* (2013.01); *H04W 72/1278* (2013.01); *H04W 74/08* (2013.01)

(58) Field of Classification Search
CPC . H04W 74/0833; H04W 16/14; H04W 72/12; H04W 74/08
See application file for complete search history.

(56) References Cited

U.S. PATENT DOCUMENTS 8,861,460 B2 * 10/2014 Chun ............... H04W 74/0833
370/329
2010/0260136 A1 * 10/2010 Fan .................. H04W 72/0453
370/330

(Continued)

FOREIGN PATENT DOCUMENTS

CN    103096489 A    5/2013
CN    103583071 A    2/2014

(Continued)

OTHER PUBLICATIONS

NTT DOCOMO, "Inter-Operator and Inter-RAT Co-Existence Techniques for LAA Using LTE," 3GPP TSG RAN WG1 Meeting #78bis, R1-144339, Ljubljana, Slovenia, Oct. 6-10, 2014, pp. 1-6.

(Continued)

*Primary Examiner* — Pao Sinkantarakorn
*Assistant Examiner* — Kabir U Jahangir
(74) *Attorney, Agent, or Firm* — Birch, Stewart, Kolasch & Birch, LLP (57) ABSTRACT

A disclosure of the present specification provides a random access method for an unlicensed band. The method comprises the steps of: transmitting, by a user equipment (UE), a random access preamble in a first cell of the unlicensed band; and receiving, by the UE, a random access response in a second cell, wherein the second cell may be a first cell, a cell of the unlicensed band, included in a cell group to which the first cell belongs, or a cell of the unlicensed band, included in a timing advance group (TAG) within the cell group, to which the first cell belongs.

4 Claims, 8 Drawing Sheets

(56) References Cited

U.S. PATENT DOCUMENTS

| | | | |
|---|---|---|---|
| 2012/0083303 A1 | 4/2012 | Min et al. | |
| 2012/0300714 A1* | 11/2012 | Ng | H04W 56/0045 370/329 |
| 2013/0010711 A1* | 1/2013 | Larsson | H04W 56/0005 370/329 |
| 2013/0083739 A1 | 4/2013 | Yamada | |
| 2013/0188616 A1 | 7/2013 | Dinan | |
| 2013/0242892 A1* | 9/2013 | Ye | H04W 74/0833 370/329 |
| 2014/0029561 A1 | 1/2014 | Kim et al. | |
| 2014/0044074 A1* | 2/2014 | Chen | H04W 74/0833 370/329 |
| 2014/0112276 A1* | 4/2014 | Ahn | H04W 74/0833 370/329 |
| 2014/0169323 A1* | 6/2014 | Park | H04W 72/1289 370/329 |
| 2016/0057800 A1* | 2/2016 | Ingale | H04W 56/0005 370/216 |
| 2017/0111874 A1* | 4/2017 | Harada | H04L 5/001 |
| 2018/0279372 A1* | 9/2018 | Takeda | H04J 11/00 |

FOREIGN PATENT DOCUMENTS

| | | |
|---|---|---|
| CN | 103597765 A | 2/2014 |
| CN | 103718600 A | 4/2014 |
| WO | WO 2012/024346 A1 | 2/2012 |
| WO | WO 2012/135998 A1 | 10/2012 |
| WO | WO 2012/153960 A2 | 11/2012 |

OTHER PUBLICATIONS

Panasonic, "Message 2 Reception Indicated by C-RNTI," 3GPP TSG-RAN WG2 Meeting #76, R2-115880, San Francisco, USA, Nov. 14-18, 2011, 2 pages.

Samsung, "Need for Cross-Carrier Scheduling in Rel-11 TDD CA," 3GPP TSG RAN WG1 #68, R1-120161, Dresden, Germany, Feb. 6-10, 2012, pp. 1-2.

Kyocera, "Design overview on LAA," 3GPP TSG RAN WG1 Meeting #87bis, Ljubljana, Slovenia, Oct. 6-10, 2014, R1-144157, 6 pages.

* cited by examiner

RANDOM ACCESS METHOD AND APPARATUS THEREFOR

CROSS REFERENCE TO RELATED APPLICATIONS

This application is the National Phase of PCT International Application No. PCT/KR2015/012833, filed on Nov. 27, 2015, which claims priority under 35 U.S.C. 119(e) to U.S. Provisional Application No. 62/085,319, filed on Nov. 27, 2014, all of which are hereby expressly incorporated by reference into the present application.

BACKGROUND OF THE INVENTION

Field of the Invention

The present invention relates to wireless communication, and more particularly, to a random access method in a wireless communication system, and an apparatus using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

A random access is a procedure for the UE to acquire uplink synchronization with a serving cell. Since the conventional random access procedure is designed under assuming that operating in an licensed band, it may be inefficient in the unlicensed band considering an interference between communication nodes.

SUMMARY OF THE INVENTION

The present invention provides a random access method operating in a unlicensed band and an apparatus using the method.

In an aspect, a random access method for an unlicensed band is provided. The method includes transmitting, by a user equipment (UE), a random access preamble in a first cell of the unlicensed band, and receiving, by the UE, a random access response in a second cell. The second cell is a cell of the unlicensed band, which is included in a cell group to which the first cell belongs, or a cell of the unlicensed band, which is included in a timing advance group (TAG) within the cell group to which the first cell belongs.

The second cell may be a cell of the unlicensed band in which downlink (DL) transmission for the UE is scheduled most quickly after the random access preamble is transmitted in the cell group.

The method may further includes transmitting, by the UE, a scheduled message in the third cell according to an uplink (UL) grant in the random access response.

The third cell may be a cell of a licensed band in the cell group to which the first cell belongs.

The random access response may comprise information regarding the third cell.

The method may further include adjusting, by the UE, a UL transmission timing for a target cell on the basis of a time alignment command (TAC) comprised in the random access response. The random access response may comprise information regarding the target cell.

In another aspect, an apparatus for performing a random access by using an unlicensed band is provided. The apparatus includes a radio frequency (RF) unit, and a processor for controlling the RF unit and configured to control the RF unit to transmit a random access preamble in a first cell of the unlicensed band and control the RF unit to receive a random access response in a second cell. The second cell is a cell of the unlicensed band, which is included in a cell group to which the first cell belongs, or a cell of the unlicensed band, which is included in a timing advance group (TAG) within the cell group to which the first cell belongs.

A random access may be performed by considering interference with various communication nodes in an unlicensed band.

DESCRIPTION OF EXEMPLARY EMBODIMENTS

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

Further, a base station (BS) used hereinafter is generally a fixed station that communicates with a wireless device, and may be referred to as another terminology, such as an evolved-NodeB (eNodeB), an evolved-NodeB (eNB), a base transceiver system (BTS), an access point, etc.

In addition, a user equipment (UE) may be fixed or mobile, and may be referred to as another terminology, such as a wireless device, a mobile station (MS), a user terminal (UT), a subscriber station (SS), a mobile terminal (MT), or the like.

The UE may be served by a plurality of serving cells. The serving cell may be classified into a primary cell (PCell) and a secondary cell (SCell). The PCell operates at a primary frequency, and is a cell designated as the PCell when an initial network entry process is performed or when a network re-entry process starts or in a handover process. The PCell is also called a reference cell. The SCell operates at a secondary frequency. The SCell may be configured after a radio resource control (RRC) connection is established, and may be used to provide an additional radio resource. At least one PCell is configured always. The SCell may be added, modified, or released by using higher-layer signaling (e.g., an RRC message).

Figure 1:
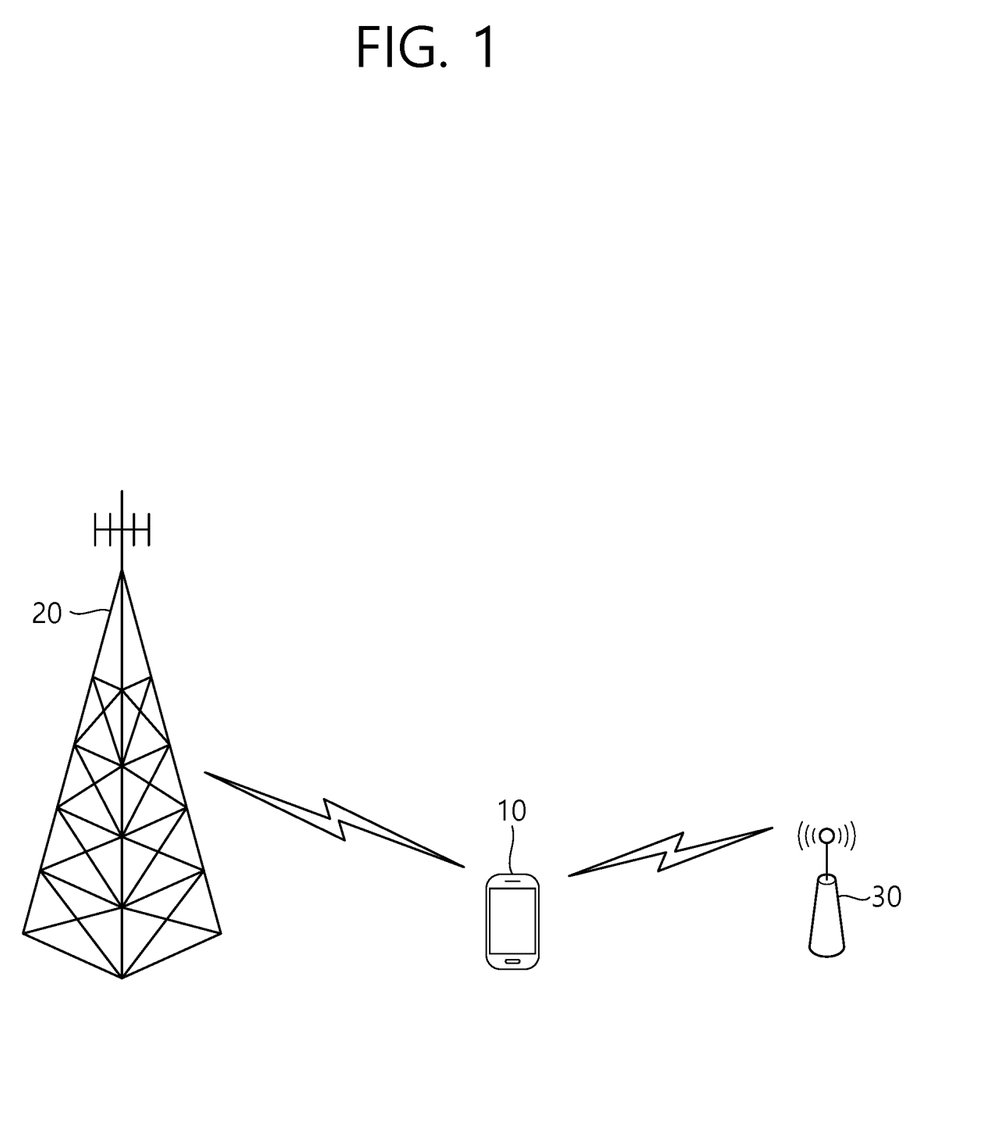
FIG. 1 shows an example of a long term evolution (LTE) system using an unlicensed band.

FIG. 1 shows an example of an LTE system using an unlicensed band.

A UE 10 establishes a connection with a $1^{st}$ BS 20, and thereafter receives a service through a licensed band. In addition, for traffic offloading, the UE 10 may receive a service through an unlicensed band with respect to a $2^{nd}$ BS 30.

The $1^{st}$ BS 20 is a BS supporting the LTE system, whereas the $2^{nd}$ BS 30 may also support other communication protocols such as a wireless local area network (WLAN) other than LTE. The $1^{st}$ BS 20 and the $2^{nd}$ BS 30 may be coupled based on a carrier aggregation (CA), and a specific cell of the $1^{st}$ BS 20 may be designated as a PCell. Alternatively, the $1^{st}$ BS 20 and the $2^{nd}$ BS 30 may be coupled based on a dual connectivity, and a specific cell of the $1^{st}$ BS 20 may be designated as the PCell.

In general, the $1^{st}$ BS 20 having the PCell has wider coverage than the $2^{nd}$ BS 30. Therefore, the $1^{st}$ BS 20 may be called a macro cell. The $2^{nd}$ BS 30 may be called a small cell, a femto cell, or a micro cell. The $1^{st}$ BS 20 may operate the PCell and zero or at least one SCell. The $2^{nd}$ BS 30 may operate at least one SCell. In addition, the SCell may be activated or deactivated by an indication of the PCell. The above description is for exemplary purposes only, and thus the $1^{st}$ BS 20 may correspond to the PCell, and the $2^{nd}$ BS 30 may correspond to the SCell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN, but the present invention is not limited thereto.

In general, it is assumed that a channel is ensured in the unlicensed band through contention between respective communication nodes. Therefore, for communication in the unlicensed band, it is required to perform channel sensing and confirm that signal transmission is not achieved by other communication nodes. As such, if it is determined that signal transmission is not achieved by other communication nodes, this case is defined as confirmation of clear channel assessment (CCA).

Since transmission of downlink (DL) from a BS or uplink (UL) from a UE may not always be guaranteed in the unlicensed band, the UE operating in the unlicensed band may always maintain an access to a cell operating in a licensed band to reliably control a mobility or radio resource management (RRM) function or the like.

The LBT must be performed preferentially in order for a BS or UE of an LTE system to have access to a channel in the unlicensed band. Further, when the BS or UE of the LTE system transmits a signal, other communication nodes such as the WLAN or the like must also perform the LBT so that interference does not occur. For example, in the WLAN, a CCA threshold is defined as −62 dBm as to a non-WLAN signal and is defined as −82 dBm as to a WLAN signal. This means that, if an LTE signal is received with power less than or equal to −62 dBm, other communication nodes do not transmit signals so that the interference does not occur.

Hereinafter, when it is said that 'LBT is performed' or 'CCA is performed', it implies that whether a channel is idle or is used by another node is confirmed first and thereafter the channel is accessed.

In addition, hereinafter, a cell operating in a licensed band is referred to as a licensed band cell, and a cell operating in an unlicensed band is referred to as an unlicensed band cell.

Figure 2:
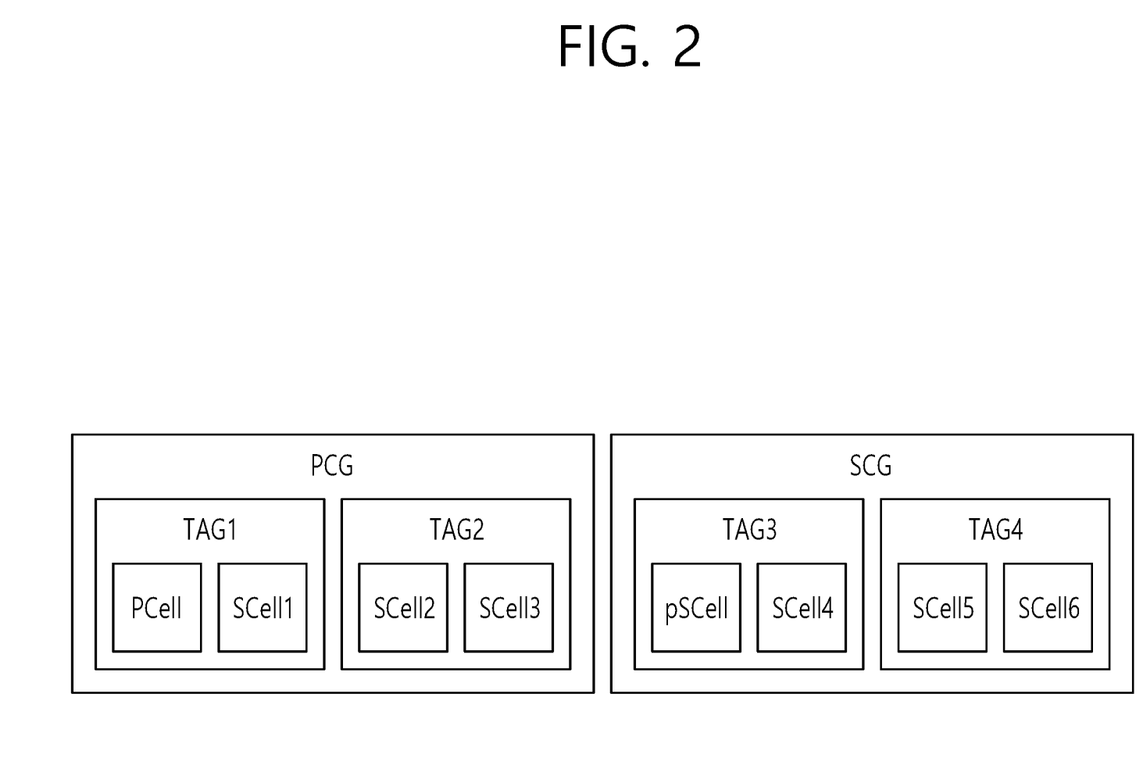
FIG. 2 shows an example of a cell group.

FIG. 2 shows an example of a cell group.

A primary cell group (PCG) is a serving cell group including a primary cell (PCell) and zero or more secondary cells (SCells). A secondary cell group (SCG) is a serving cell group including a primary secondary cell (PSCell) and zero or more secondary cells (SCells). The PSCell may be an SCell for performing a random access in the SCG. It may be divided into one or more timing advance groups (TAGs) in the serving cell group. The TAG is a cell group which is configured by a radio resource control (RRC) and which uses the same timing advance (TA).

The PCG includes a TAG1 and a TAG2. The TAG1 includes a primary cell (PCell) and a first secondary cell (SCell1), and the TAG2 includes a second secondary cell (SCell2) and a third secondary cell (SCell3). The SCG includes a TAG3 and a TAG4. The TAG3 includes a PSCell and a fourth secondary cell (SCell4), and the TAG4 includes a fifth secondary cell (SCell5) and a sixth secondary cell (SCell6). The number of TAGs and cells included in each TAG are for exemplary purposes only.

Although the PCell operates in the licensed band, at least any one of the PSCell and the SCell1 to SCell6 may operate in the unlicensed band. An unlicensed band cell or a licensed band cell may be configured as the SCell through RRC signaling in the PCell, and information regarding to which TAG the SCell belongs may also be provided to a UE.

Figure 3:
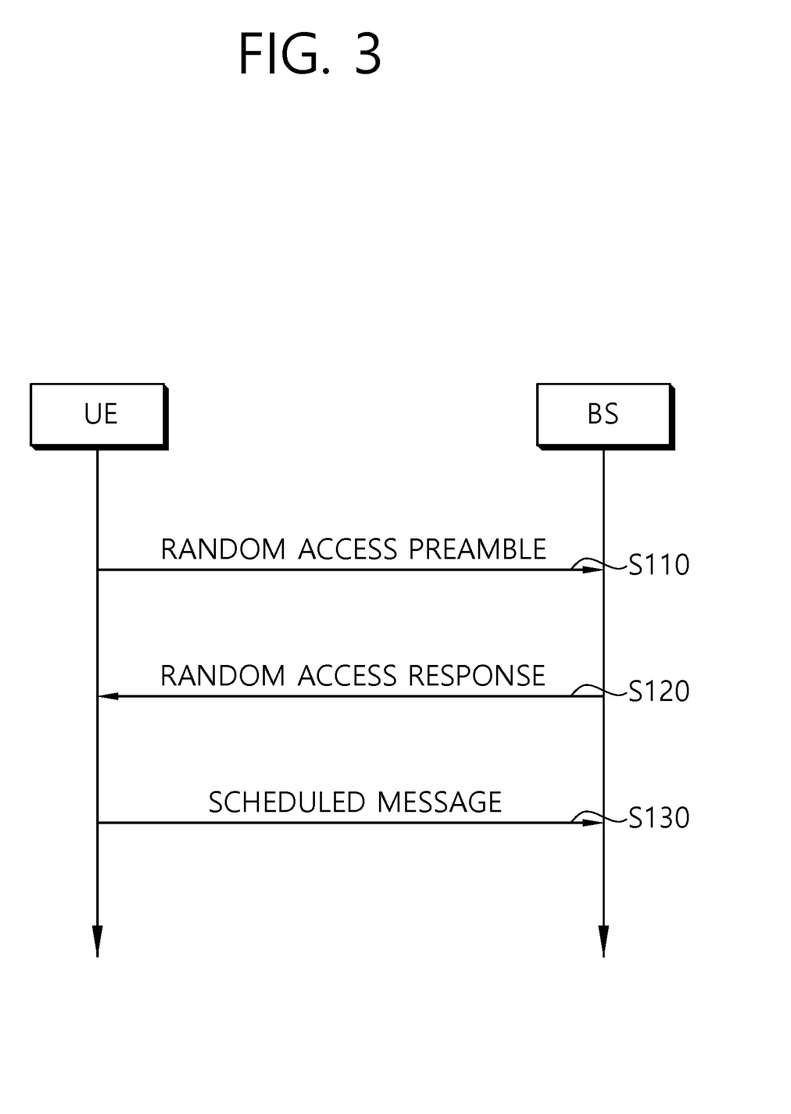
FIG. 3 shows an example of a random access procedure according to the conventional technique.

FIG. 3 shows an example of a random access procedure according to the conventional technique.

The random access procedure is used by a UE to obtain uplink synchronization with a BS or to allocate an uplink radio resource.

The UE receives a root index and a physical random access channel (PRACH) configuration index from the BS.

The root index is a logical index used by the UE to generate 64 candidate random access preambles (RAPs). The RAP is a signal transmitted by the UE in an area predetermined for UL synchronization. The RAP may be referred to as a synchronization signal in a sense that it is a signal for requesting UL synchronization.

The PRACH configuration index indicates a specific subframe and preamble format capable of transmitting the RAP. The RAP is limited to a specific time and frequency resource for each cell.

The UE selects any RAP, and transmits the selected RAP to the BS (S110). More specifically, the UE selects one of the 64 candidate RAPs. The UE selects a corresponding subframe by using the PRACH configuration index. In addition, the UE transmits the selected RAP through the selected subframe.

Upon receiving the RAP, the BS transmits a random access response (RAR) to the UE (S120). The RAR is detected in two steps. First, the UE detects a physical downlink control channel (PDCCH) masked with a random access-radio network temporary identifier (RA-RNTI). Next, the UE receives the RAR included in a medium access control (MAC) protocol data unit (PDU) through a physical downlink shared channel (PDSCH) indicated by the detected PDCCH.

Figure 4:
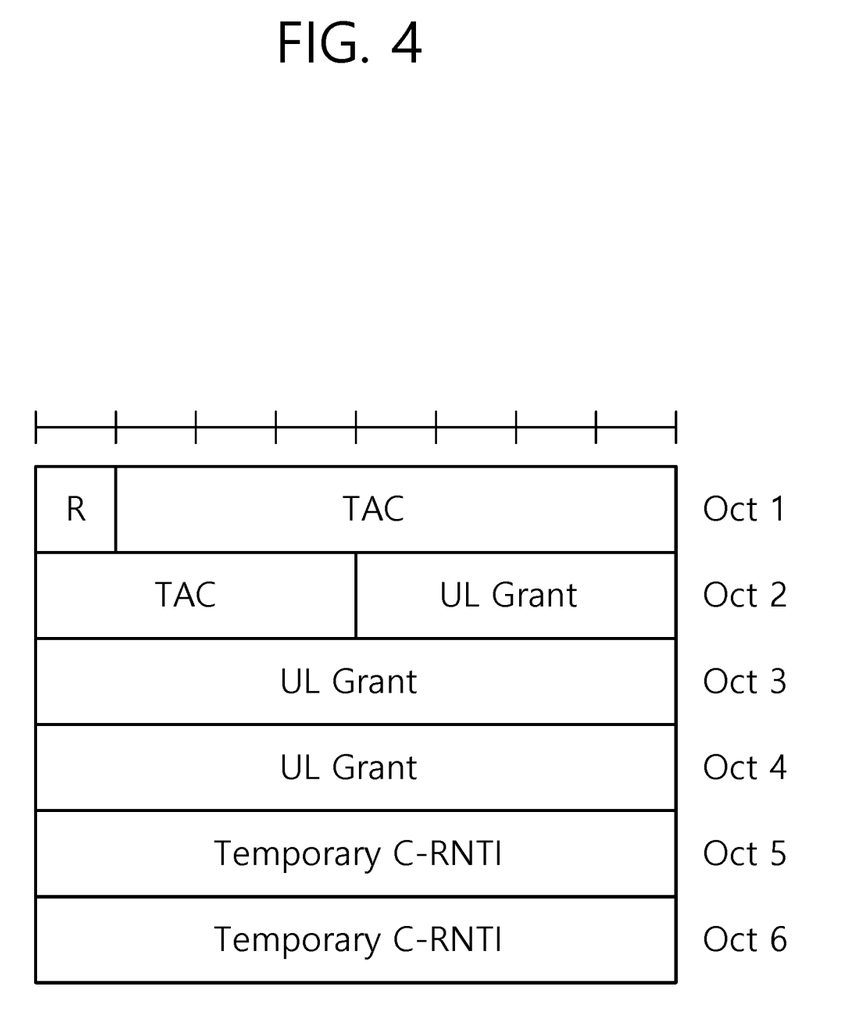
FIG. 4 shows an example of a random access response according to the conventional technique.

FIG. 4 shows an example of a random access response according to the conventional technique.

The random access response may include a time alignment command (TAC), a UL grant, and a temporary cell-RNTI (C-RNTI).

The TAC is information indicating a TA value which is sent by a BS to a UE to maintain a UL time alignment (TA). The UE updates UL transmission timing by using the TA value. A time alignment timer is started or restarted when the UE updates the TA.

The UL grant includes a UL resource allocation and transmit power command (TPC) used in message transmission. The TPC is used to determine transmit power for a scheduled PUSCH.

Returning to FIG. 3, the UE transmits to the BS a scheduled message according to the UL grant included in the random access response (S130).

The random access procedure based on the conventional technique considers only one serving cell. Therefore, a TA for one serving cell in which a random access preamble is exchanged with the random access response may be obtained, and UL synchronization may be adjusted.

However, a plurality of serving cells may be configured to one UE, and the plurality of serving cells may operate in different TAGs or different bands (e.g., a licensed band or an unlicensed band).

Hereinafter, a method of performing a random access procedure in an unlicensed band cell is proposed. The unlicensed band cell may be an SCell or an independent cell.

Figure 5:
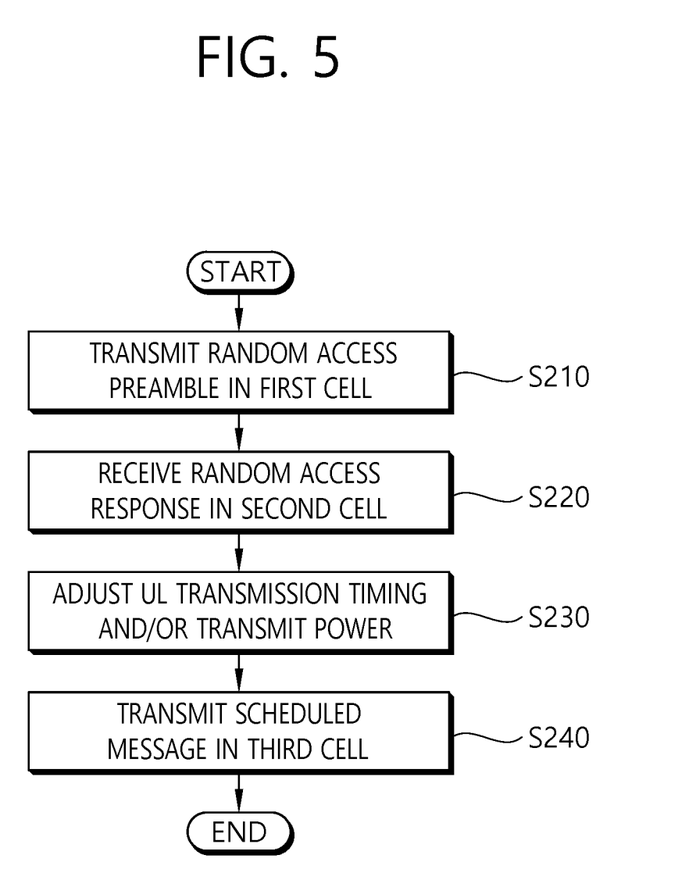
FIG. 5 shows a random access method according to an embodiment of the present invention.

FIG. 5 shows a random access method according to an embodiment of the present invention.

A UE may transmit a random access preamble in a first cell of an unlicensed band (S210).

The UE receives a random access response in a second cell (S220). The random access response may include information regarding UL transmission timing and/or transmit power of the UE. In addition, the random access response may include information regarding a cell or cell group when the UE transmits a scheduled message.

The second cell in which the UE receives the random access response (RAR) may be defined as follows.

1) The second cell may be a licensed band cell included in a cell group to which the first cell for transmitting the random access preamble belongs. More specifically, the licensed band cell may be a PCell or a PSCell.

2) The random access preamble may be transmitted at the request of a specific cell. The second cell may be a cell for requesting transmission of the random access preamble or a cell included in a cell group to which the cell for requesting transmission of the random access preamble belongs.

3) The second cell may be an unlicensed band cell included in the first cell in which the random access preamble is transmitted, or a cell group to which the first cell belongs or a TAG to which the first cell belongs.

The second cell may be an unlicensed band cell in which DL transmission for a corresponding UE is scheduled most quickly after the random access preamble is transmitted.

4) The second cell may be determined on the basis of information such as a cell ID, sequence, timing, frequency resource, or the like of the first cell in which the random access preamble is transmitted.

The UE adjusts UL transmission timing and/or transmit power on the basis of the information included in the received random access response (S230).

The UE may adjust the UL transmission timing and/or the transmit power as follows.

1) The UE may adjust the UL transmission timing and/or transmit power for the first cell which has transmitted the random access preamble and an unlicensed band cell belonging to the same TAG of the first cell.

2) The UE may adjust the UL transmission timing and/or transmit power for a cell or TAG in which a scheduled message is transmitted.

The random access response may include information regarding a target cell for adjusting the UL transmission timing and/or the transmit power. The UE may adjust the UL transmission timing and/or the transmit power according to the information regarding the target cell.

The UE may transmit a scheduled message according to a UL grant included in the random access response in a third cell (S240). The third cell may be one of the licensed band cell and the unlicensed band cell.

The third cell in which the UE transmits the scheduled message may be defined as follows.

1) If the random access preamble is transmitted in an unlicensed band cell belonging to a master cell group (MCG), the third cell may be a licensed band cell belonging to the MCG. More particularly, the third cell may be a primary cell (PCell) in the MCG.

2) If the random access preamble is transmitted in an unlicensed band cell belonging to an SCG, the third cell may be a licensed band cell included in the SCG. More particularly, the third cell may be a PSCell in the SCG.

3) The third cell may be a licensed band cell included in a cell group to which the first cell belongs or a TAG to which the first cell belongs.

4) The third cell may be an unlicensed band cell included in a cell group to which the first cell belongs or a TAG to which the first cell belongs.

5) The third cell may be an unlicensed band cell which is scheduled most quickly after receiving a random access response among a plurality of unlicensed band cells, and in which UL transmission is possible as a result of confirming a channel state.

6) The third cell may be a licensed band cell in a TAG to which the first cell for transmitting the random access preamble belongs. If the licensed band cell is not included in the TAG to which the first cell belongs, the third cell may be the unlicensed band cell in the TAG.

7) The third cell may be one of a plurality of licensed band cells or unlicensed band cells determined on the basis of information such as a cell ID, sequence, timing, frequency resource, or the like of the first cell in which the random access preamble is transmitted.

8) If information regarding a cell or cell group in which the scheduled message is transmitted is included in the random access response, the third cell may be determined on the basis of the information.

Figure 6:
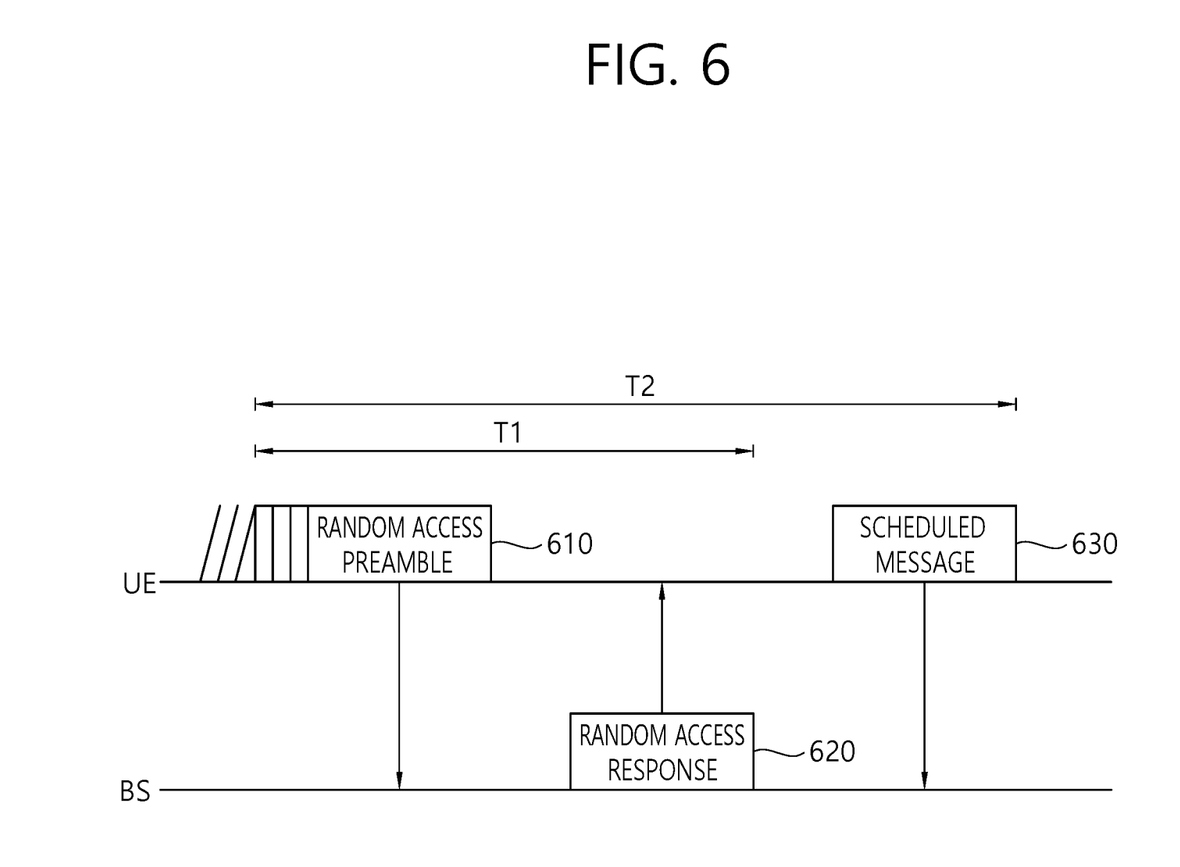
FIG. 6 shows a random access method according to another embodiment of the present invention.

FIG. 6 shows a random access method according to another embodiment of the present invention.

Assume that a BS manages a first cell, a second cell, and a third cell. The first cell, the second cell, and the third cell may be the same cell or may be different cells.

If a channel is idle after performing CCA, a UE transmits a random access preamble 610 in the first cell of an unlicensed band. The UE receives a random access response 620 in the second cell. Then, the UE transmits a scheduled message 630 in the third cell.

Figure 7:
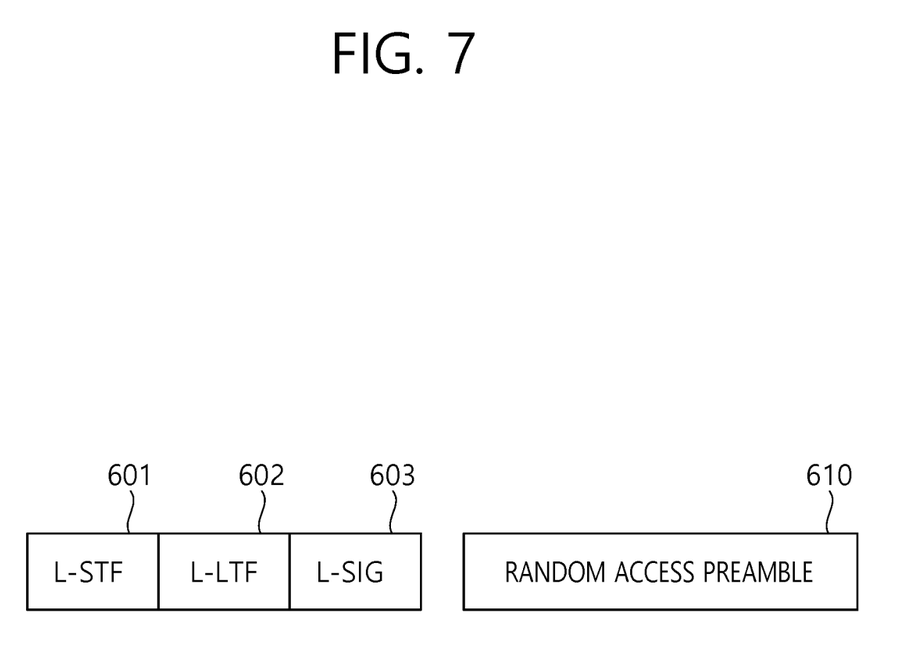
FIG. 7 shows a random access preamble according to an embodiment of the present invention.

FIG. 7 shows a random access preamble according to an embodiment of the present invention.

A UE may transmit a legacy short training field (L-STF) 601, a legacy long training field (L-LTF) 602, and a legacy signal field (L-SIG) 603 before transmitting the random access preamble 610.

The L-STF 601 may be utilized in carrier sensing for detecting that a signal exists in a channel currently in use, automatic gain control for adjusting a radio signal which is input to an antenna to an operating area of an analog circuit and an analog-to-digital converter, and coarse carrier frequency offset correction.

The L-LTF 602 may be used for fine carrier frequency offset correction and symbol synchronization, and may be used for channel response estimation for demodulation of the L-SIG 603.

The L-SIG 603 is generated as a bit sequence having information indicating a transmission time to prevent another communication node from accessing a corresponding channel during a corresponding random access procedure is performed. More specifically, the L-SIG 603 may indicate a transmission time (T1 of FIG. 6) corresponding to a sum of a time required to transmit a random access preamble and a time required to receive a random access response. Alternatively, the L-SIG 603 may indicate a transmission time (T2 of FIG. 6) corresponding to a sum of the time required to transmit the random access preamble, the time required to receive the random access response, and a time required to transmit a scheduled message.

Figure 8:
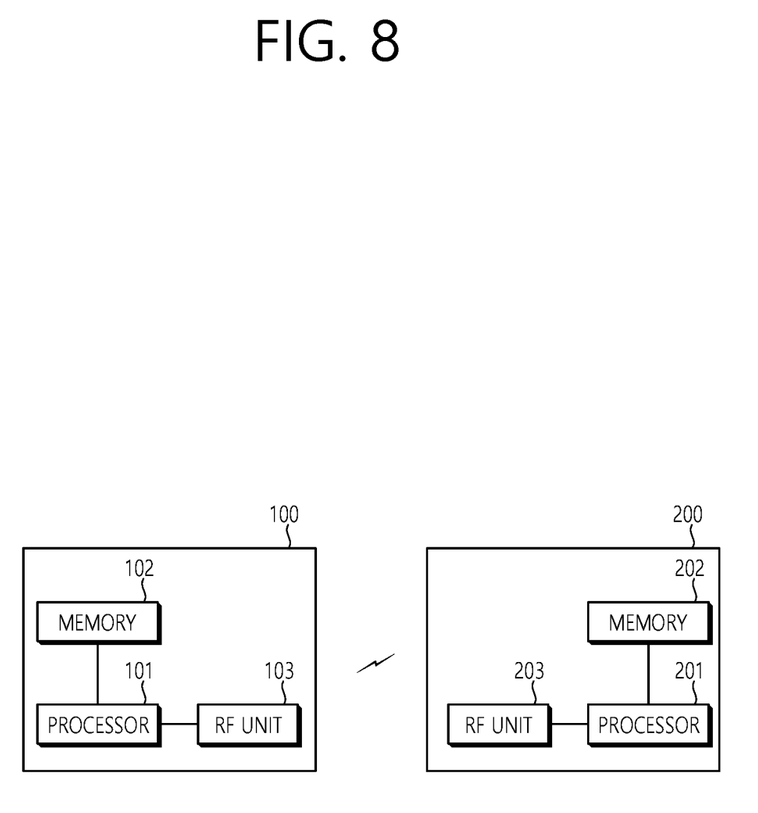
FIG. 8 is a block diagram showing a wireless communication system for implementing the present invention.

FIG. 8 is a block diagram showing a wireless communication system for implementing the present invention.

A BS 200 includes a processor 201, a memory 202, and a radio frequency (RF) unit 203. The memory 202 is coupled to the processor 201, and stores a variety of information for driving the processor 201. The RF unit 203 is coupled to the processor 201, and transmits and/or receives a radio signal. The processor 201 implements the proposed functions, procedures, and/or methods. In the aforementioned embodiment, an operation of the BS may be implemented by the processor 201.

A UE 100 includes a processor 101, a memory 102, and an RF unit 103. The memory 102 is coupled to the processor 101, and stores a variety of information for driving the processor 101. The RF unit 103 is coupled to the processor 101, and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A random access method for an unlicensed band, the method comprising:
    transmitting, by a user equipment (UE), a random access preamble in a first cell of the unlicensed band; and
    receiving, by the UE, a random access response in a second cell,
    wherein the second cell is a cell of the unlicensed band, which is included in a cell group to which the first cell belongs, or a cell of the unlicensed band, which is included in a timing advance group (TAG) within the cell group to which the first cell belongs,
    wherein the second cell is a cell of the unlicensed band in which downlink transmission for the UE is scheduled most quickly after the random access preamble is transmitted in the cell group,
    wherein the random access response includes information related to an uplink transmission timing and a transmit power of the UE, and
    wherein the random access response further includes an uplink (UL) grant that is used to transmit a scheduled message in a third cell,
    adjusting, by the UE, the uplink transmission timing and the transmit power of the UE based on the information included in the random access response; and
    transmitting, by the UE, the scheduled message in the third cell according to the UL grant in the random access response,
    wherein the third cell is one of a plurality of licensed band cells or unlicensed band cell that is determined based on information of the first cell related to a cell identifier, a sequence, a timing, and a frequency resource.

2. The method of claim 1, wherein the third cell is a cell of a licensed band in the cell group to which the first cell belongs.

3. An apparatus for performing a random access by using an unlicensed band, the apparatus comprising:
    a transceiver; and a processor configured to:
    control the transceiver to transmit a random access preamble in a first cell of the unlicensed band, and control the transceiver to receive a random access response in a second cell,
    wherein the second cell is a cell of the unlicensed band, which is included in a cell group to which the first cell belongs, or a cell of the unlicensed band, which is included in a timing advance group (TAG) within the cell group to which the first cell belongs, wherein the second cell is a cell of the unlicensed band in which downlink transmission by a base station is scheduled most quickly after the random access preamble is transmitted in the cell group, wherein the random access response includes information related to an uplink transmission timing and a transmit power of the UE, and wherein the random access response further includes an uplink (UL) grant that is used to transmit a scheduled message in a third cell, adjust the uplink transmission timing and the transmit power of the UE based on the information included in the random access response; and control the transceiver to transmit the scheduled message in the third cell according to the UL grant in the random access response, wherein the third cell is one of a plurality of licensed band cells or unlicensed band cell that is determined based on information of the first cell related to a cell identifier, a sequence, a timing, and a frequency resource.

4. The apparatus of claim 3, wherein the third cell is a cell of a licensed band in the cell group to which the first cell belongs.

* * * * *